United States Patent [19]

Ball

[11] 4,308,099
[45] Dec. 29, 1981

[54] NUCLEAR REACTOR SAFETY SYSTEM

[75] Inventor: Russell M. Ball, Euclid, Ohio

[73] Assignee: The Babcock & Wilcox Company, New Orleans, La.

[21] Appl. No.: 5,123

[22] Filed: Jan. 22, 1979

[51] Int. Cl.³ ............................................. G21C 7/00
[52] U.S. Cl. .................................................. 376/217
[58] Field of Search .................. 176/19 EC, 20 R, 24; 364/504

[56] References Cited

U.S. PATENT DOCUMENTS

| 3,423,285 | 1/1969 | Curry | 176/24 |
| 3,752,735 | 8/1973 | Musick | 176/24 |
| 4,045,282 | 8/1977 | Barbier | 176/24 |
| 4,075,059 | 2/1978 | Bruno | 176/24 |
| 4,080,251 | 3/1978 | Musick | 176/24 |

Primary Examiner—Donald P. Walsh
Attorney, Agent, or Firm—Vytas R. Matas; Joseph M. Maguire

[57] ABSTRACT

A safety system (10) for shutting down a nuclear reactor under overload conditions is provided using a series of parallel-connected computing modules (14a, 14b, 14c, 14d, 14e) each of which receives data on a particular reactor parameter (P, T, $\phi_T$, $\phi_B$, W) and each of which produces a function [f(P), f(T), f($\phi_T$), f($\phi_B$), f(W)] indicating the percentage of maximum reactor load that the parameter (P, T, $\phi_T$, $\phi_B$, W) contributes. The various functions [f(P), f(T), f($\phi_T$), f($\phi_B$), f(W)] are added together to provide a control signal (S) used to shut down the reactor under overload conditions.

6 Claims, 1 Drawing Figure

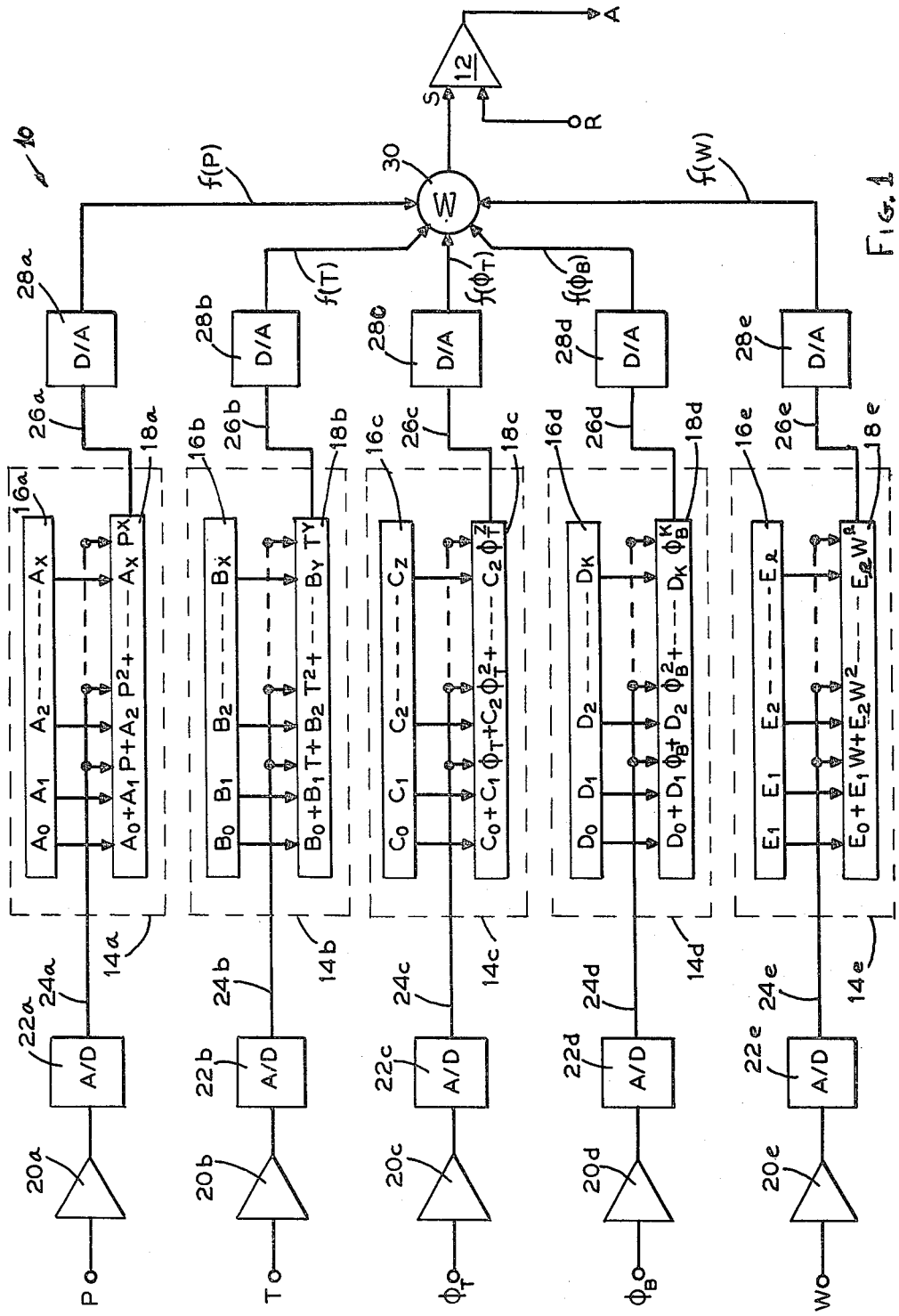

NUCLEAR REACTOR SAFETY SYSTEM

TECHNICAL FIELD

This invention relates to nuclear reactor safety systems in general and in particular to such systems having digital computing modules which accept data in parallel for continuous and repetitive calculation of parallel functions indicative of percentage of reactor maximum power load.

BACKGROUND ART

Safety systems for nuclear reactors are known which implement digital computing modules as part of the reactor protection system. These modules implement standard digital techniques such as are used in computers. The essence of these techniques is the conversion of input signal to digital form, storage in memory, the use of a stored program to manipulate the stored data and the presentation of an output. All of these functions are essentially performed serially in the time domain by a single central computer.

The disadvantage of such prior art systems is the length of time required to do the calculations in sequence and the complexity of a program that has to manipulate in serial fashion the individual measured parameters. The normal sequence involves the taking in of data parameters to perform series of calculations and at the end of the calculations to produce data which determines whether or not the reactor is in a safe operating posture.

Another problem of such prior art devices comes from the nature of digital computers operating in this fashion causing data to lose identity except for address location. Hence the tracing of programs or the debugging of faults in the system becomes time consuming and difficult. The serial computer system in order to be continuously and exhaustively tested and retested to assure proper safety control require that each of the measured parameters affecting safety have every possible value or state relative to all the other parameters. For example, if possible reactor temperatures could have 4000 different possible values and pressure have 4000 different possible values between and liquid flow 4000 possible values the number of possible input states to the serial calculating machine would be 4000 to the third power. To exhaustively test this, even at the rate of one every tenth second, would require the order of hundreds of years. Thus, other means have been employed to assure that there are no flaws in programs for safety systems. This involves extensive review and checking by independent technical groups and regulatory authorities.

SUMMARY OF THE INVENTION

The present invention solves the problems associated with the prior art systems as well as others by providing a safety system for a nuclear reactor which uses a parallel combination of computing modules each of which receives data on a particular parameter and each of which produces functions which are added together. Each individual function of the parallel set is therefore composed of a combination of a single parameter and a set of constants. Each parameter is independently converted to a function of that parameter so that a check can be made between the parameter and the output using all possible states of that parameter. Using the previous example of each parameter having 4000 possible states, the number of possible combination states that have to be tested becomes not 4000 to the third power but 4000 plus 4000 plus 4000 or 12,000 possible states. At the rate of testing of one per tenth second, testing would take roughly 30 minutes. Thus, the system can be exhaustively tested with all possible values of the parameter being applied at the input and tested to determine that all functions of that parameter at an analog output are correct. This permits both input and output to be tested in analog form for each individual parameter.

Another advantage of the present invention is the ease with which parameters may be changed or added by changing a set of constants going into the computing module performing the function calculation. With these changes function can be adjusted to any desired value.

Thus, in view of the foregoing, it will be seen that one aspect of the present invention is to provide a safety system for a nuclear reactor which individually calculates functions of various parameters affecting the safety of the nuclear reactor to produce a safety control signal therefrom.

Another aspect of the present invention is to provide a safety system for a nuclear reactor which can be exhaustively tested with all possible values of the parameters affecting the safety of the system.

These and other aspects of the present invention will be more clearly understood after a review of the following description of the preferred embodiment when considered with the drawings.

BRIEF DESCRIPTION OF THE DRAWING

FIG. 1 is a schematic representation of the safety system of the present invention.

DESCRIPTION OF THE PREFERRED EMBODIMENT

Referring now to the drawing wherein the showings are for purposes of illustrating a detailed description of a preferred embodiment and are not intended to limit the invention thereto, FIG. 1 shows a nuclear reactor safety system 10 which develops a control signal S indicative of the percentage of reactor full power limit. This signal S is compared in a comparing amplifier 12 to a reference signal R indicative of a reactor full power. The comparing amplifier 12 establishes an alarm or shut down signal to the reactor (not shown) whenever the control signal S is equal to or less than the power signal R.

The control signal S may be represented as the sum of functions of various measured reactor parameters as follows:

$$S = f(P) + f(T) + f(\phi_B) + f(W)$$

Where:

$$f(P) = A_0 + A_1 P + A_2 P^2 + \cdots A_x P^x$$

$$f(T) = B_0 + B_1 T + B_2 T^2 + \cdots B_y T^y$$

$$f(\phi_T) = C_0 + C_1 \phi_T + C_2 \phi_T^2 + \cdots C_z \phi_T^z$$

$$f(\phi_B) = D_0 + D_1 \phi_B + D_2 \phi_B^2 + \cdots D_k \phi_B^k$$

$$f(W) + E_0 + E_1 W + E_2 W^2 + \cdots E_m W^m$$

where the A's, B's, C's, D's, and E's are constants selected to fit a pre-calculated safety function by some criteria (such as least square) and where P=reactor pressure, T=reactor temperature, $\phi_T$=neutron flux escaping from the upper portion of the reactor, $\phi_B$=the neutron flux escaping from the lower portion of the reactor, and W=flow of cooling fluid in the reactor.

The pre-calculated function for each of the sensed reactor parameters, P, T, $\phi_T$, $\phi_B$, W is determined from thermal hydraulic experiments which determine the maximum amount of heat which can be removed from a specific volume of an operating nuclear reactor.

By way of example, the pressure parameter P contribution has been experimentally found to be $$f(P) = A_1 P + A_2/P^2$$

This experimentally-derived expression can be fit, for all usuable values of P, by an polynomial expression of the form shown on page 7, line 6. The values for $A_0$, $A_1$, $A_2$, ... $A_x$ are set by the required accuracy of the fit. In practice, no polynominal has been found to adequately represent the expression less than third degree terms of P.

Similarly, the functions of T, $\phi_T$, $\phi_B$, and W have been experimentally derived and adequately fit with polynomials of third degree or less. Such experimentally-derived expressions and their polynominal fit are known to those skilled in the art and will not be detailed herein for the sake of conciseness.

In the safety system 10 the reactor parameters are sensed by transducers appropriately placed on and in the reactor in a manner known to those skilled in the art. These measured parameter signals, P, T, $\phi_T$, $\phi_B$, W are individually amplified by their respective amplifiers 20a, 20b, 20c, 20d, and 20e and the respective amplified signals are converted to digital values analog to digital converters 22a, 22b, 22c, 22d, and 22e series connected to the amplifiers 20a, 20b, 20c, 20d, and 20e.

Each of the forementioned functions f(P), f(T), f($\phi_T$), f($\phi_B$), f(W) forming the control signal S are respectively calculated in parallel-connected microprocessors 14a, 14b, 14c, 14d, and 14e. The microprocessors 14a, 14b, 14c, 14d, 14e have respective memory sections 16a, 16b, 16c, 16d, 16e and respective program sections 18a, 18b, 18c, 18d, 18e.

The operation of the system 10 can be best described as simultaneously conducting similar operations on each sensed reactor parameter P, T, $\phi_T$, $\phi_B$, W as will be described occurring to the parameter P.

The then current value of the parameter P (pressure) is sensed by a transducer properly located in or on the nuclear reactor to provide such a measurement. This measured pressure P analog value is then transmitted to the amplifier 20a which amplifies and filters the analog pressure P signal before transmitting it to an analog to digital converter 22a which forms the digital counterpart of the analog amplified signal for pressure P. The digital counterpart of the measured pressure P signal is then transmitted along line 24a to be inputed simultaneously along parallel terminals of the line 24a to the programming section 18a of the microprocessor 14a into each of the polynomial elements indicating the measured pressure signal P. The programming section 18a of the microprocessor 14a then calls for the input of the various precalculated constants $A_0$, $A_1$, $A_2$, ... $A_x$ stored in the memory section 16a of the microprocessor 14a to be fed into the programming section 18a. The programming section 18a then calculates the digital value for the polynomial expressions stored in the programming section 18a. The digital value of the polynomial or f(P) is then transmitted along line 26a to a digital to analog converter 28a which then produces an analog value for the calculated expression of the function f(T).

Calculations of the recited type which form the function f(P) can be done on single chip microprocessors commercially available. Such a microprocessor is Model Number 8085 manufactured by The Intel Corporation. These types of microprocessors are acceptable for all the microprocessors 14a, 14b, 14c, 14d, and 14e.

As was mentioned, all of the microprocessors 14a, 14b, 14c, 14d, and 14e simultaneously act in a similar manner on their respective parameter to calculate their respective functional parameter expressions from their respectively programmed functional polynomial calculations. All of these simultaneously calculated functional expressions f(P), f(T), f($\phi_T$), f($\phi_B$), f(W) are then added together at an adding station 30 to provide the previously mentioned control signal which when compared to the reference signal R establishes the safety alarm signal A.

Clearly, various improvements and modifications will occur to those skilled in the art upon the reading of this specification. All such improvements and modifications have been deleted herein for the sake of conciseness and readability but are intended to be within the scope of the following claims.

I claim:

1. A safety system for a nuclear reactor comprising:
   a series of transducers for measuring various different parameters of the nuclear reactor's operation;
   a series of parallel-connected computing stations each individually connected to each of the transducers measuring one different parameter of the nuclear reactor's operation with each computing station calculating a function of that particular parameter connected thereto indicative of percentage of maximum reactor load contributed by that parameter;
   a summing station for receiving all of the functional outputs of all the respective computing stations and summing them up to establish a control signal indicative of maximum percentage of full power reactor operation.

2. A safety system as set forth in claim 1 including a comparing station for comparing the control signal from said summing station with a power signal to establish an alarm signal whenever said control signal is less than said power signal.

3. A safety system as set forth in claim 2 including a series of analog to digital converters mounted between each transducer and its respective computing station for converting the analog signal of each transducer to a digital signal for the computing station.

4. A safety system as set forth in claim 3 including a series of digital to analog converters individually mounted between said summing station and each of said computing stations to convert the digital output signal of said computing stations to an analog signal for the summing station.

5. A safety system as set forth in claim 4 wherein each of the computing stations is a microprocessor having a memory section and a computing section with a polynomial expression representative of the percentage of full power contribution of the respective parameter stored in the computing section with the constants for the polynomial expression being stored in the memory section of each microprocessor; said computing section of each microprocessor constantly drawing the then current value for the parameter in a parallel manner to the polynomial expression and drawing the constants from the memory section in the calculation of the polynomial expression.

6. A safety system as set forth in claim 5 wherein the parameters of the nuclear reactor sensed by respective transducers include reactor pressure, temperature, cooling fluid flow, neutron flux, escaping from the upper portion of the reactor and neutron flux escaping from the lower portion of the reactor.

* * * * *

UNITED STATES PATENT AND TRADEMARK OFFICE
CERTIFICATE OF CORRECTION

PATENT NO. : 4,308,099
DATED : December 29, 1981
INVENTOR(S) : RUSSELL M. BALL

It is certified that error appears in the above-identified patent and that said Letters Patent are hereby corrected as shown below:

Column 2, line 55, change "$S=f(P)+f(T)+f(\phi_B)+f(W)$"

to -- $S=f(P)+f(T)+f(\phi_T)+f(\phi_B)+f(W)$ --.

Signed and Sealed this

Sixteenth Day of March 1982

[SEAL]

Attest:

GERALD J. MOSSINGHOFF

Attesting Officer       Commissioner of Patents and Trademarks